(12) United States Patent
Randall

(10) Patent No.: X2417
(45) Date of Patent: Jan. 4, 1816

(54) PRINTING BOOKS

(76) Inventor: Samuel Randall

Samuel Randall

Letters Patent

The Schedule referred to in these Letters Patent and making part of the same containing a description in the words of the said Samuel Randall himself of his improvement in ~~[illegible]~~ of Printing Books Each syllable in a word is distinguished or pointed out by one small mark (called or denominated syllabical) placed just below or above the face of the letters and point between the last letter of one syllable and first letter of the next so that each syllable in a word is readily perceived by the reader and the words pronounced with the same ease as when their syllables are separated by spaces or hyphens as in the following words Religious Disposition Mediterranean Philosophical Hieroglyphical Metamorphosis —

The accented Syllables are distinguished by double [illegible] that is one above and one below the right side of the last letter of the accented syllable as Typical Witnesses
Royal [illegible]
Paul [illegible]

Samuel Randall

Drawing not required

[illegible]